J. E. AND W. H. SMITH.
GREEN COB CORN TRIMMER.
APPLICATION FILED DEC. 3, 1920.
1,367,508.
Patented Feb. 1, 1921.
3 SHEETS—SHEET 1.
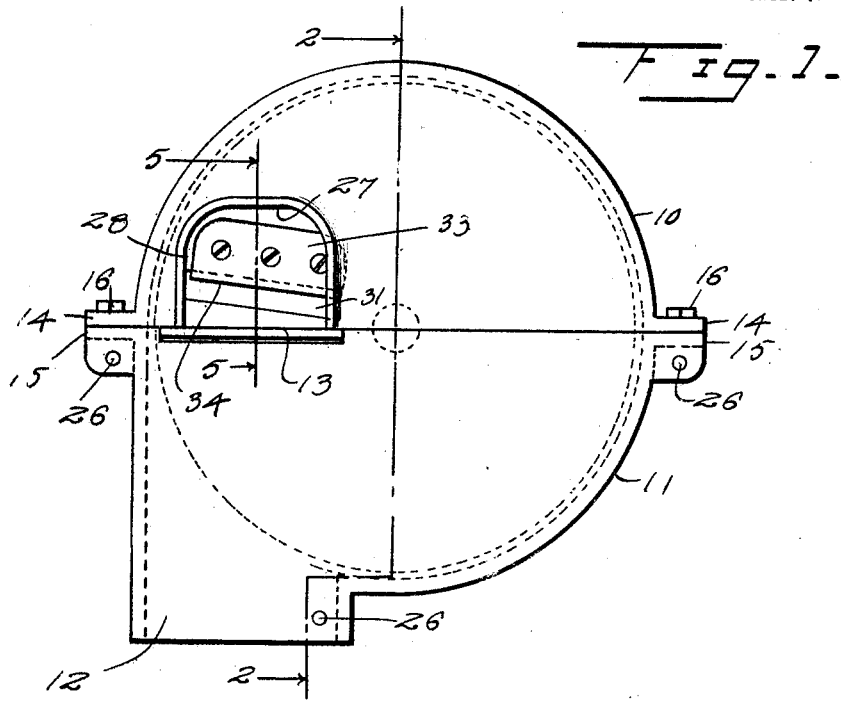
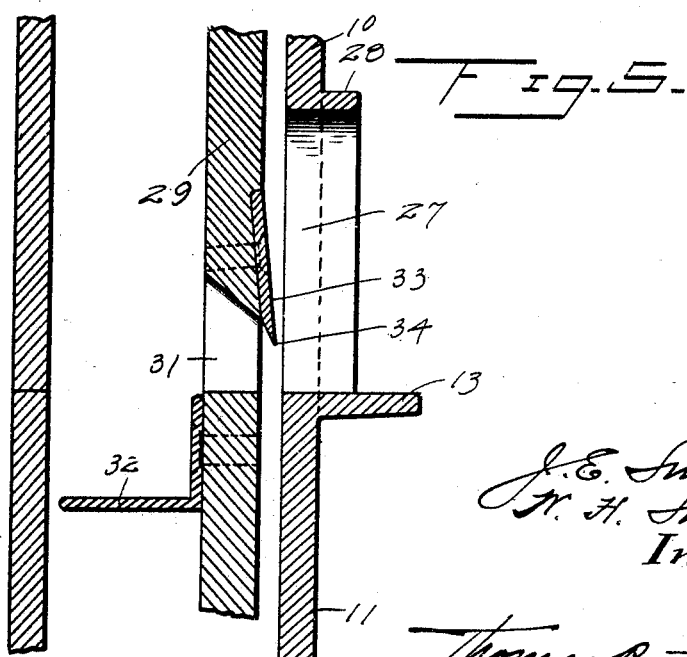
J. E. Smith
W. H. Smith
Inventors
Thomas R. Harvier
By Atty

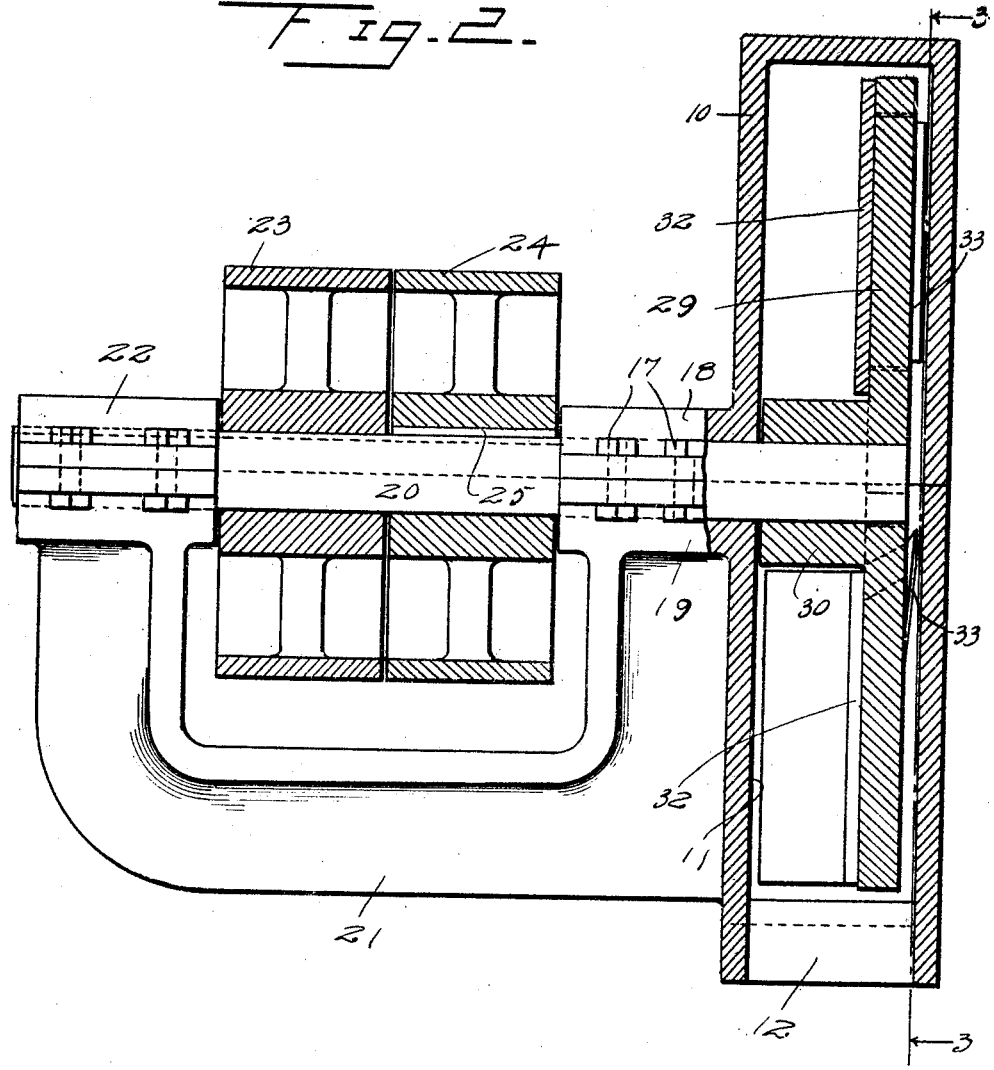

J. E. AND W. H. SMITH.
GREEN COB CORN TRIMMER.
APPLICATION FILED DEC. 3, 1920.

1,367,508.

Patented Feb. 1, 1921.
3 SHEETS—SHEET 3.

J. E. Smith.
W. H. Smith.
Inventors.

By Thomas R. Harney
Atty

UNITED STATES PATENT OFFICE.

JOHN E. SMITH AND WILLIAM H. SMITH, OF CHASKA, MINNESOTA.

GREEN-COB-CORN TRIMMER.

1,367,508.     Specification of Letters Patent.     Patented Feb. 1, 1921.

Application filed December 3, 1920. Serial No. 428,014.

*To all whom it may concern:*

Be it known that we, JOHN E. SMITH and WILLIAM H. SMITH, citizens of the United States of America, residing at Chaska, in the county of Carver and State of Minnesota, have invented certain new and useful Improvements in Green-Cob-Corn Trimmers, of which the following is a specification.

Our present invention relates generally to cutting devices, and more particularly to a cob corn trimmer, our object being the provision of a simple, practical and efficient device whereby the ends and butts of green cob corn may be trimmed preparatory to canning, in order to remove surplus portions of the cob remaining after husking of the corn as well as the worm eaten ends in order that the cob will be in a highly sanitary condition in the final removal of the kernels for canning.

A further object of our invention is the provision of a small, compact and convenient machine which will effectively clear itself in spite of the starchy and sticky nature of the material cut, and which may be readily cleaned, adjusted and repaired.

Figure 3:
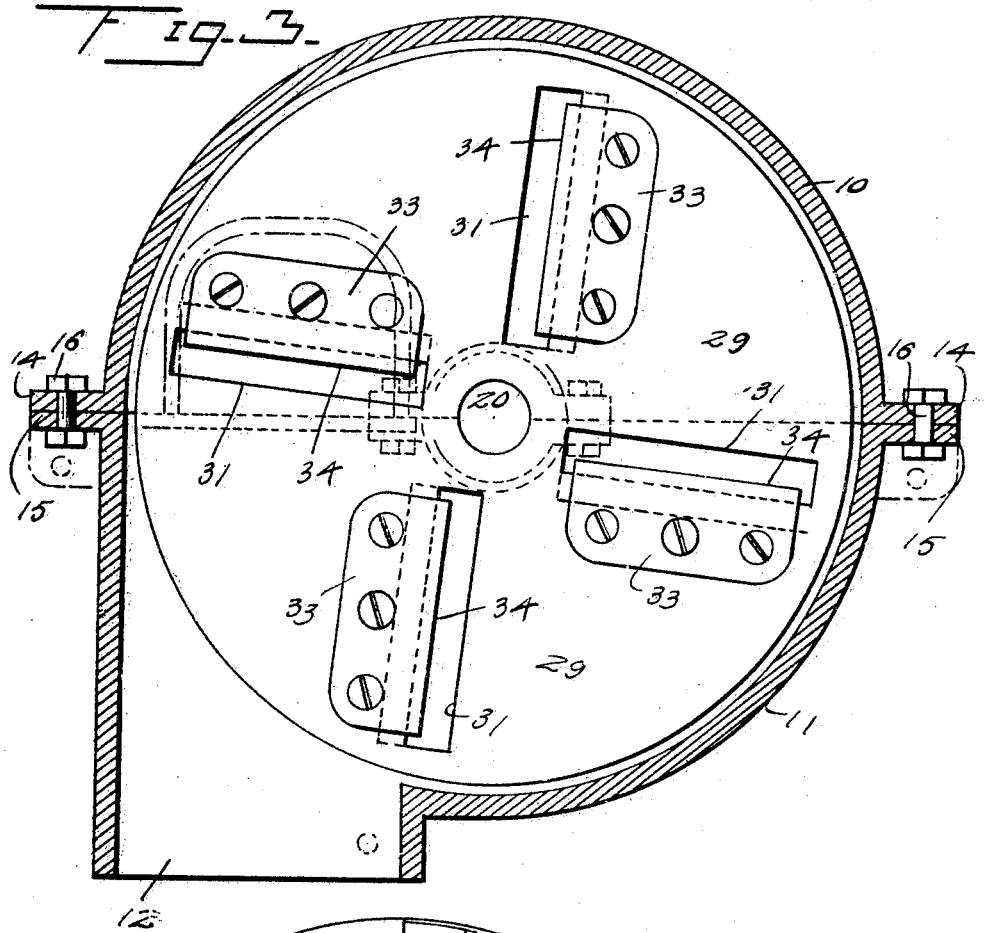
Figure 4:
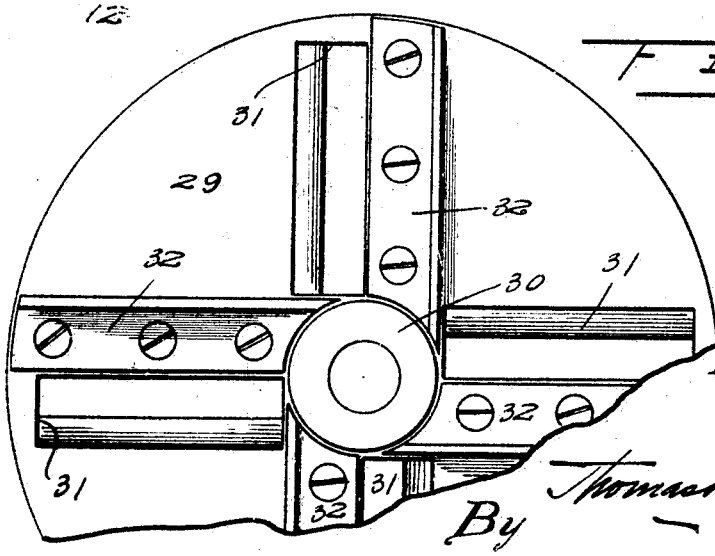

With these objects, our invention resides in the construction, arrangement and operation of parts to be now described with respect to the accompanying drawings which form a part of this specification and wherein, Figure 1 is a front elevation of our improved machine, Fig. 2 is a vertical longitudinal section taken therethrough substantially on line 2—2 of Fig. 1, Fig. 3 is a vertical cross section taken therethrough substantially on line 3—3 of Fig. 2, Fig. 4 is a partial rear elevation of the cutter removed, and Fig. 5 is a detail vertical section on an enlarged scale, taken substantially on line 5—5 of Fig. 1.

Referring now to these figures our invention proposes a machine embodying a cylindrical casing in upper and lower semicylindrical sections 10 and 11, the latter of which has a lower depending discharge neck 12 at one side of the vertical plane of the axis of the casing, below a forwardly outstanding flange 13 which extends along a portion of the upper edge of the lower section.

The two sections 10 and 11 have connecting flanges 14 and 15 as seen in Figs. 1 and 3, securely fastened in use by bolts 16, and by removal of these bolts and bolts 17 shown in Fig. 2, the upper section 10 can be easily removed in order to permit of ready access to the cutter located within the casing as hereinafter described.

The bolts 17 last mentioned serve to connect reduced semicylindrical rearward hub extensions 18 and 19 of the casing sections 10 and 11 as seen in Fig. 2, which extensions coact to form the front or inner bearing of a shaft 20, and the lower casing section 11 is preferably integral with the forward upright leg of a U-shaped bracket 21 whose rear leg has a similarly split bearing 22 for the rear end of shaft 20.

Within the bracket 21 shaft 20 is preferably provided with a pair of pulleys 23 and 24, the former being loose on the shaft and the latter being keyed thereto as at 25 in Fig. 2 so that we thus provide for ready shipping of a driving belt (not shown), in the starting and stopping of the machine in use.

In setting up the machine the bracket 21 may be disposed upon any suitable support to which the casing may be connected by bolts, screws and the like through apertures 26 of the lower section flanges 15 as seen in Fig. 1 and also through the depending discharge neck 12.

Immediately above the upper forwardly projecting flange 13 of the lower section 11, the upper section 10 of the casing has a feed opening 27, preferably surrounded by a forwardly outstanding guard flange 28, the inner upper edge of the flanged portion of the lower section 11 forming a shearing point in coöperation with the cutting blades in use.

Secured upon the forward end of the shaft 20 within the casing is a circular cutting disk 29 whose rearwardly projecting hub portion 30 at the forward end of the forward or inner bearing coacts with the keyed drive pulley disposed at the rear of the said bearing, to prevent endwise movement and play of the cutter disk 29 so that the latter is maintained in fixed relation to the front wheel of the casing adjacent to the inner surface of which the disk rotates as plainly shown in Figs. 2 and 5.

As seen particularly in Figs. 3, 4 and 5, the disk 29 has a series of radial slots 31 which extend therethrough and which provide for movement of the severed portions of a cob from the front of the disk in the feed opening 27 to the rear of the disk where such severed portions of the cob are free to drop through the discharge neck 12 of the lower section 11 and their descending movement is facilitated by angular discharge plates or paddles 32 secured radially, or nearly so, of the rear face of the disk 29 for movement in the space between the disk and the rear wall of the casing.

Secured upon the forward face of disk 29 are the cutting blades 33, each positioned so that its beveled cutting edge projects partially across the rear side of one of the disk slots 31 in respect to the direction of movement or rotation of the disk, said cutting blade being positioned in parallel offset relation to the radial lines of the several slots 31 so as to avoid too great a tendency to force the cobs toward the outer edge or periphery of the disk in the cutting operation.

The cutting blades 33 are moreover set into and secured within countersunk portions of the front face of the disk 29, the bases of which countersunk portions extend in inclined relation to the median plane of the disk as plainly seen in Fig. 5 so that the cutting edges 34 project toward and into close proximity to the inner surface of the front wall of the casing and thus into effectively coöperating relation with the shearing point at the lower inner portion of the feed opening 27.

Thus in operation it is simply necessary that the feed operator successively advance the ends of green cob corn within the feed opening 27 and into the path of movement of the cutters, in order that surplus portions of the cob at the butt end may be removed as well as worm eaten or sparsely kerneled tips, may be effectively cut away, it being noted that the feed opening 27 is of sufficient width to permit a cob to be shifted into the influence of the cutter either at right angles to the plane of rotation of the disk or at angles inclined with respect to a right angle. The portions of the cob severed in this way are shifted in the cutting action rearwardly through the slots 31 of disk 29 and either fall in the space between the disk and the rear wall of the casing downwardly through the discharge neck 12, or are forced downwardly and discharged by the action of the discharge paddles 32 in order that the cutting disk may be continually cleared during operation when it might otherwise become clogged owing to the starchy, sticky nature of the product.

Our invention thus provides a practical, durable and effective arrangement requiring little if any particular skill on the part of the operator, and which will be of great advantage over the usual hand method of trimming cobs as at present.

We claim:

1. A cob corn trimming machine including a cylindrical casing in upper and lower detachably connected sections, a bracket with which the lower section is fast, bearings at the forward and rear portions of the bracket, a shaft journaled in the said bearings and extending at its forward end into the casing, pulleys on the shaft arranged in said bracket, a disk secured on the shaft within the casing and rotating adjacent to the front wall of the latter, said front wall of the casing having a feed opening and said lower section of the casing having a depending discharge neck, said disk having radial slots therethrough, cutting blades secured to the forward surface of the disk and moving therewith adjacent to the front wall of the casing, and discharge paddles secured radially of the disk upon its rear surface and moving therewith adjacent to the rear wall of the casing, substantially as described.

2. A cob corn trimming machine including a casing having a feed aperture in one wall and a lower discharge opening, a shaft projecting axially through the other wall of the casing, a cutting disk secured on the shaft, having a series of radially slotted openings. cutting blades paralleling the said slots and secured on one face of the disk adjacent to the apertured wall of the casing, and discharge paddles also paralleling the slots and secured upon the opposite face of the disk as described.

In testimony whereof we have affixed our signatures.

JOHN E. SMITH.
WILLIAM H. SMITH.